INVENTOR.
LADISLAV KELEMEN
BY
J. B. Holden
ATTORNEY

July 28, 1964   L. KELEMEN   3,142,361
TURBO-BRAKE AND DRIVE MEANS THEREFOR
Filed May 10, 1962   2 Sheets-Sheet 2

INVENTOR.
LADISLAV KELEMEN
BY
J. B. Holden
ATTORNEY

United States Patent Office 3,142,361
Patented July 28, 1964

3,142,361
TURBO-BRAKE AND DRIVE MEANS THEREFOR
Ladislav Kelemen, Akron, Ohio, assignor to The Goodyear Tire & Rubber Company, Akron, Ohio, a corporation of Ohio
Filed May 10, 1962, Ser. No. 193,702
6 Claims. (Cl. 188—90)

The present invention relates to turbo-brakes, and especially to a turbo-brake adapted for use with a vehicle to serve as an auxiliary or supplemental braking means in combination with conventional brake means so that the combination can be used in braking installations where conventional brake means alone may have their capacities exceeded under extreme braking conditions.

It is well recognized that the loads applied to brakes on vehicles today are being increased in many instances. Thus either the vehicles themselves are getting larger and heavier, and/or the vehicles, such as airplanes, are landing and taking off at higher speeds so that the higher weights and/or speeds of the vehicles necessarily require greater braking forces for satisfactory braking action.

Different types of brake means have been proposed for use heretofore, and one particular type of brakes used widely today on vehicles, such as airplanes, is a friction brake using a plurality of axially aligned, relatively rotatable discs that can have axial compression forces placed thereon to provide the braking action. These brakes heretofore have provided satisfactory braking forces for stopping an aircraft, for example, in a reasonable length run upon landing. However, it naturally is desirable to stop the airplane in shorter distances, and it likewise is very desirable to have improved braking forces available for heavier aircraft, or for aircraft landing at higher speeds. Likewise, improved braking action is needed on aircraft having relatively high take-off speeds, under rejected take-off conditions.

The general object of the present invention is to provide a novel and improved turbo-brake characterized by the use of reaction vanes operatively associated with a driven impeller in the turbo-brake to furnish additional braking action by transferring large amounts of energy to the air discharged from the impeller at high speeds of flow.

Another object of the invention is to provide a novel and improved type of a turbo-brake means wherein the turbo-brake includes an impeller carried by the axle and driven from the wheel by compound planetary or epicyclic gear train means with a primary and secondary drive and that has a variable drive ratio for the impeller so that it is driven at a controllable but higher rate of speed than the wheel over a relatively wide range of drive speed ratios.

A further object of the invention is to provide impeller vanes of improved design and lower weight in a turbo-brake carried by a wheel axle and to position a shroud ring in operative association with such vanes.

Another object of the invention is to provide an improved turbo-brake for rapidly absorbing large amounts of kinetic energy from a moving vehicle, and improved gear train drive means therefor.

The foregoing and other objects and advantages of the invention will be made more apparent as the specification proceeds.

Attention now is particularly directed to the accompanying drawings, wherein.

When referring to corresponding members shown in the drawings and referred to in the specification, corresponding numerals are used to facilitate comparison therebetween.

Figure 1:
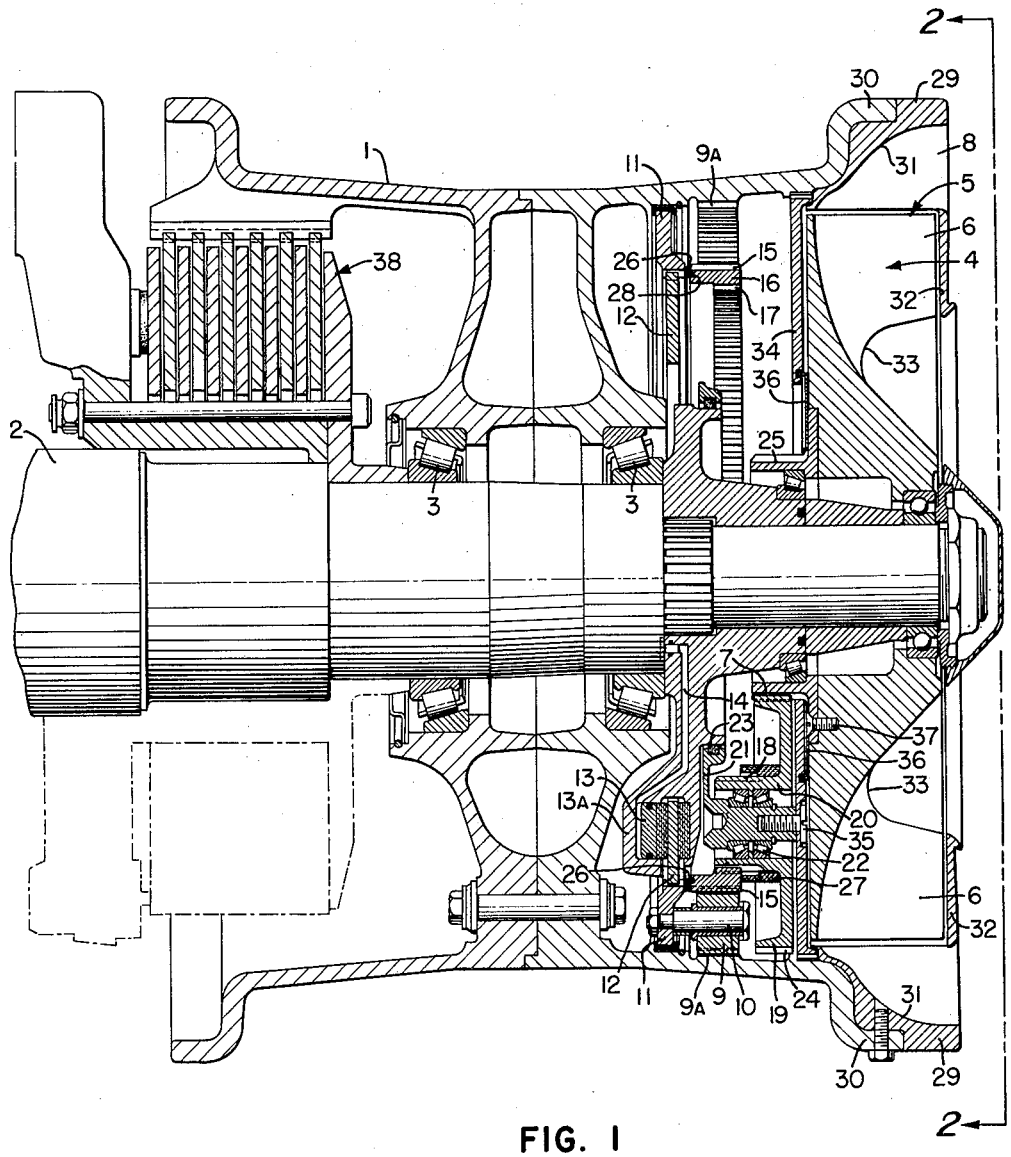
FIG. 1 is an elevation, partially broken away and shown in vertical section, of a wheel unit having a turbo-brake embodying the principles of the invention operatively carried thereby.

The present invention, generally speaking, relates to the combination of an axle, and a wheel journalled on the axle, with a turbo-brake, including an impeller, operatively carried by the axle to draw in the air from adjacent the axle and discharge it in a substantially radially outwardly extending direction after having transferred energy thereto, planetary gear means operatively connecting the wheel to the impeller to drive it at a controllable and greater speed than the speed of the wheel, and reaction vane means on the wheel encompassing the impeller to receive air discharged therefrom and effect further braking action on the wheel by transferring additional energy to such discharged air.

Attention is now particularly directed to the details of the structure shown in the drawings, and a conventional wheel 1 adapted for supporting a pneumatic tire or tires thereon is shown journalled on an axle 2 by conventional bearings 3. The axle 2 is of the type used on vehicles, such as aircraft, and a turbo-brake, indicated as a whole by the numeral 4, is operatively carried by the axle. Such turbo-brake 4 draws in air from adjacent the axle 2 and rapidly transfers energy to large volumes of such air to translate the inertia of the vehicle to which the axle 2 is secured into braking forces required to rotate an impeller 5 of the turbo-brake and produce rapid flow of large volumes of air moved into and discharged by the turbo-brake. The impeller 5 has substantially radially extending vanes 6 thereon for drawing air axially inwardly into the turbo-brake 4 and rapidly forcing large masses or volumes of air substantially radially outwardly of the impeller 5 after greatly increasing the velocity of such air.

As will hereinafter be described in more detail, a suitable compound gear train, or gear means 7 operatively connect the wheel 1 to the impeller 5 to drive it at a greater speed than the rotational speed of the wheel 1 for improved turbo-braking action.

As an important feature of the present invention, reaction vane means 8 are preferably formed on, or suitably attached to, the wheel 1 at an end of the wheel and within a wheel flange to receive air discharged in a generally radially outwardly direction from the impeller 5 and transfer more energy thereto while also to facilitate smooth discharge of such air from the impeller and turbo-brake means of the invention.

In the present embodiment of the invention, a compound planetary or epicyclic gear train with a primary and secondary drive has been provided for the impeller 5. What is described as being the primary drive means comprises an epicyclic gear train that includes a plurality of pinions 9 journalled on shafts 10 secured to a carrier disc, or annular plate 11. This plate 11 is connected to the axle 2 by suitable splined engagement with the brake means that form a clutch in the epicyclic gear drive, and in this instance, a brake disc 12 is operatively associated with conventional brake, or piston means 13 that is carried by a housing 13a and has a control bore 14 connecting therefor for supply of pressure fluid to control the action of the piston means 13. Such control bore 14 connects to a source of braking pressure fluid, such as is obtained from a conventional brake operating cylinder, or the like. It will be realized that these brake, or piston means 13 provide the brake disc 12 and the plate 11 operatively connected thereto with a controllable rotational speed with relation to the wheel 1.

Figure 2:
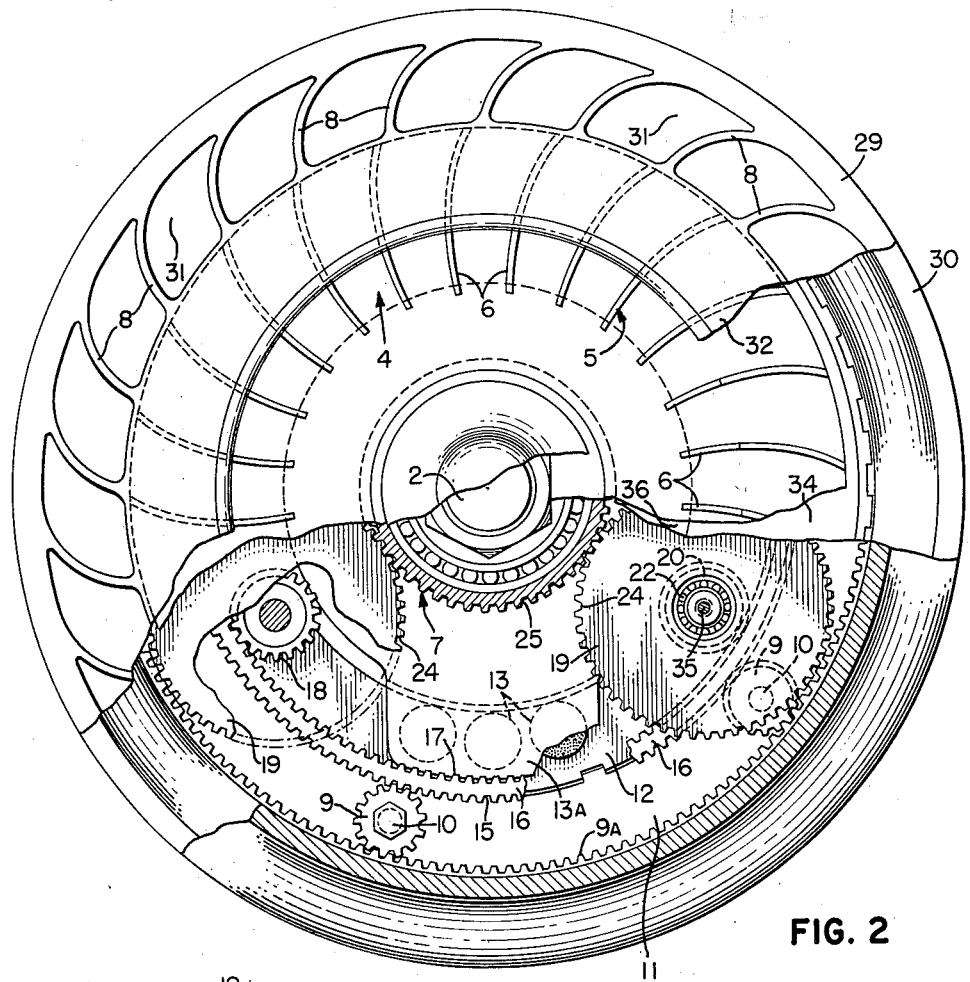
FIG. 2 is an elevation taken on line 2—2 of FIG. 1, but with parts of the wheel, turbo-brake unit, and drive means therefor being broken away to show the components of the turbo-brake.

The pinion gears 9 are driven by an internal ring gear 9a secured to the wheel 1 and they engage with and drive an external gear 15 formed on or carried by a floating ring gear 16, FIG. 2, in the wheel and turbo-brake assembly. This ring gear 16 has an internal gear, or gear teeth 17, formed thereon or secured thereto that are in turn meshed with a small diameter gear, or pinion 18 of a compound planetary gear 19. The planetary gears 19 have individual positioning hubs, or support shafts 20, that are journalled on a support ring, or plate 21 by bearings 22. Such support plate 21 is supported on a portion of the clutch housing 13a as by means of a low friction positioning ring, or gasket 23 operatively carried by the axle 2.

The planetary gear 19, by gear teeth 24 formed thereon, engages a sun or hub gear 25 formed on or suitably secured to the impeller 5 to complete the primary drive means for the turbo-brake.

By actuation of the brake or piston means 13, the rate of rotation of the pinion gears 9 with relation to the wheel 1 can be varied and thus the rotational speed of the floating ring gear 16 and drive means for the impeller can be widely varied.

A guide ring 26 and several similar rings 27 engage axially opposed ends of the internal or floating gear 16 and axially adjacent portions of the gear train means to maintain the components thereof in proper assembled and operative relationship with each other. The guide ring 26 is shown as being of generally L-shape in radial section and it is received in an annular recess 28 formed in the floating gear 16 to aid in maintaining the guide ring 26 in proper operative position between the plate 11 and the floating gear. Each of the guide rings 27 provided is carried by one of the support shafts 20 of the compound planetary gears 19 for bearing on an end of the floating gear 16 and an adjacent portion of the planetary gears 19 to maintain the floating gear in proper position. Such guide rings 26 and 27, as well as the support ring 23, and other bearing or gasket means provided in the gear train means, are made from low friction, long-lived material, such as "Teflon" plastic.

Figure 3:
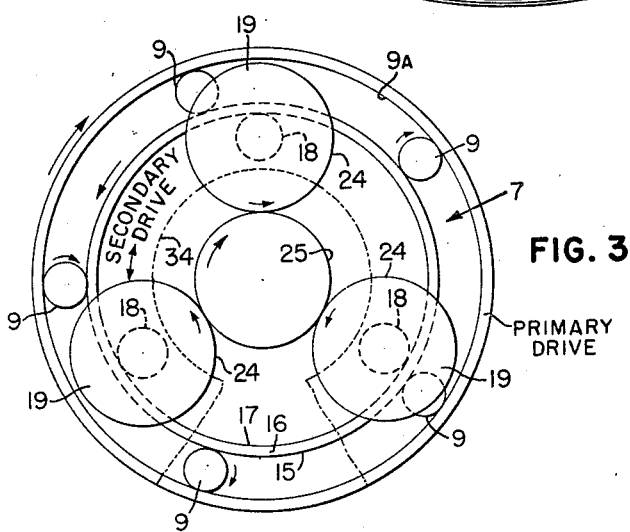
FIG. 3 is a diagrammatic view of the epicyclic gear train means used in the drive of the impeller-brake of the invention.

FIG. 3 of the drawings is of interest as it shows that when the wheel 1 is rotating in the direction indicated, the pinions 9 will drive the floating ring gear 16 in the opposite direction and the compound planetary gear 19 serves to drive the impeller 5 in the same direction as the wheel. By the compound planetary and epicyclic gear means of the invention, extremely rapid rotation of the impeller is obtained for absorbing large amounts of kinetic energy from a vehicle by extremely rapid work upon large volumes of air in a very short time. The impeller can be driven at ratios up to 20 to 40 times the rotational speed of the wheel 1 and a very satisfactory, rapid braking action is obtained by increasing the velocity of large masses and volumes of air.

It has been determined by test that the braking forces of the brake of the invention have been improved approximately 20 percent by the reaction vanes 8 carried by the wheel 1 over a similar turbo-brake having no reaction vanes. These reaction vanes 8, which extend in a generally radial direction, are uniformly circumferentially spaced and are of slightly arcuate shape and curved in a manner to produce a change of momentum of the air masses being discharged. This change in momentum will equal the additional retarding force produced by the reaction vanes. The reaction vanes 8 are of increasing curvature in a circumferentially directed arc with increasing distance from the center of the impeller 5. The reaction vanes 8 are operatively positioned by a ring 29 that is shown bolted to the wheel 1 on the radially inner surface of a wheel flange 30. The ring 29 has a smoothly contoured radially inner surface, or base 31 for each of the pockets formed by the reaction vanes 8 to facilitate a smooth change in directional flow of the air received from the impeller 5 from a generally radial direction to a generally axial direction for discharge from the brake. The reaction vanes 8 may extend axially beyond the adjacent margins of the wheel flange 30, as well as beyond the impeller 5. The reaction vanes 8 also have a shroud disc, or ring 32 formed as a portion thereof or operatively secured thereto for radially overlapping the axially outer ends of the vanes 6.

The vanes 6 each have a recess 33 provided in their radially inner, axially outer sections where they connect to the tubular centered conical base, or hub portion of the impeller to aid in reducing the mass of the impeller and to increase the effective air inlet eye of the impeller. By the provision of the cut-out, or recessed sections 33 in the impeller vanes 6, the weight and mass of the impeller has been reduced and the intake efficiency of the turbo-brake has been increased due to the low solidity of the impeller adjacent the radially inner, axially outer portions thereof.

The turbo-brake 4 of the invention also includes a secondary, drive, or positioning plate 34 which is axially slidably engaged with the wheel 1 on the inner surface thereof intermediate the planetary drive means and the impeller 6 of the turbo-brake to rotate with the wheel. Such positioning plate 34 is secured to the hubs 20 of the compound planetary gears 19 by members, such as cap screws 35 and thereby provides the secondary drive of the planetary gears. The positioning plate 34 also overlaps a metal plate or disc 36 that is secured by cap screws 37 or the like to the impeller 5 on the inboard side thereof. The positioning plate 34 and disc 36 prevent undesired dirt and impurities from entering the turbo-brake drive of the invention.

It will be seen that the primary drive means for the impeller 5 comprises a compound planetary gear train of the turbo-brake 4 and that a relatively high ratio of impeller to wheel speed can be obtained by this drive means alone. However, by use of the secondary drive means of the invention, the transmission rate can be boosted to very high values without any appreciable increase in complexity and weight of the drive means. It can also be seen that the brake disc 12 can be either retained in a stationary position, or be permitted to rotate at a controlled rate in relation to the wheel speed so that an infinitely variable ratio of speed can be provided for the brake disc and the floating ring gear 16 to which the pinions 9 connect. Hence, the drive of the impeller in the turbo-brake can likewise be varied widely. Normally the brake disc 12 would be locked to the housing 13a on the axle to avoid production of frictional heat in the clutch means of the turbo-brake.

It will be seen that the impeller in the turbo-brake has a drive, which can be broadly described as a gear train drive, and more correctly speaking, the gear train means comprises a compound planetary, or epicyclic gear train means with a primary and secondary drive therefor. It should be realized that the drive of the impeller 5 by the compound planetary gears and by the ring gear 16 by the positioning plate 34 may be called the primary drive and the drive provided by the pinions 9 may be considered or termed the secondary drive. In practice of the invention, the novel reaction vane means of the turbo-brake 4 can be used with any known drive means, but the specific structure disclosed is believed to be particularly satisfactory for most applications.

By the turbo-brake of the invention and associated means, a very effective braking action is obtained. This braking action on a vehicle, such as an aircraft, can be at least primarily obtained by the turbo-brake 4 upon initial landing conditions, but with friction brake means 38 provided in association with the wheel 1 gradually taking over for final braking action after a good portion of the kinetic energy of landing of the vehicle has been absorbed by the turbo-brake. The turbo-brake will have an excellent life with a minimum of maintenance. Hence it is believed that the objects of the invention have been achieved.

While certain representative embodiments and details have been shown for the purpose of illustrating the invention, it will be apparent to those skilled in this art that various changes and modifications may be made therein without departing from the spirit or scope of the invention.

What I claim is:

1. In combination with an axle and a wheel journalled on said axle,
   a turbo-brake including an impeller operatively carried by said axle to draw in air from adjacent said axle and perform work thereon,
   compound planetary gear means including pinion shafts operatively connecting said wheel to said impeller for primary drive thereof to drive it at a greater speed than the speed of said wheel,
   positioning plate means operatively connecting to said wheel and journalling said planetary gear pinion shafts thereon for secondary drive of said planetary gear means,
   a carrier disc rotatably associated with said axle,
   drive pinions journalled on said carrier disc and operatively engaging said wheel and said planetary gear means,
   clutch means operatively engaging said carrier disc to control rotation thereof in relation to said wheel, and
   reaction vane means operatively associated with the periphery of said impeller to receive air discharged therefrom and effect further braking action by work performed thereon, said reaction vane means being generally radially directed and being formed to direct air radially and axially outwardly of said wheel.

2. A turbo-brake for connection between a wheel and an axle on which the wheel is journalled, which turbo-brake comprises
   a rotary-type air mover including an impeller having a hub rotatably carried by said axle,
   a plurality of generally radially extending vanes on said impeller,
   said impeller when rotated drawing air axially inwardly adjacent said axle and forcing air generally radially outwardly of said wheel,
   annular shroud means secured to said wheel adjacent said impeller but extending radially inwardly thereof to overlap said impeller on the axially outer side thereof,
   ring gear means operatively associated with the inner periphery of said wheel,
   pinion gears engaging said ring gear means,
   a disc on which said pinion gears are journalled, said disc being operatively carried by said axle,
   a floating internal gear ring carried by said axle and having both internal and external gear means thereon with said external gear means engaging said pinion gears,
   planetary gear means operatively journalled on said axle and engaging said internal gear means,
   sun gear means operatively carried by said hub and engaging said planetary gears to be driven thereby,
   said sun gear means operatively engaging said impeller hub to drive said impeller,
   a brake disc carried by said axle and operatively engaging said disc to control rotation thereof,
   control means operatively positioned on said axle to engage said brake disc and control rotation thereof and that of said first-named disc to control the drive speed of said impeller in relation to the speed of said wheel,
   a drive plate operatively carried by said wheel and engaging journals of said planetary gear means thereby providing a secondary drive input therefor, and
   circumferentially spaced reaction vane means operatively associated with the periphery of said impeller to receive air discharged therefrom and effect further braking action by work performed thereon said reaction vanes being formed to direct air radially and axially outwardly of said wheel.

3. A turbo-brake for connection between a wheel and an axle on which the wheel is journalled, which turbo-brake comprises
   a rotary-type air mover including an impeller having a hub rotatably carried by said axle,
   a plurality of generally radially extending vanes on said impeller,
   said impeller when rotated drawing air axially inwardly adjacent said axle and forcing air generally radially outwardly of said wheel,
   ring gear means operatively associated with the inner periphery of said wheel,
   pinion gears engaging said ring gear means,
   a disc on which said pinion gears are journalled, said disc operatively engaging said wheel,
   a floating gear ring carried by said axle and having both internal and external gear means thereon with said external gear means engaging said pinion gears,
   compound planetary gear means including support shafts operatively engaging said internal gear means,
   sun gear means operatively carried by said hub and engaging said planetary gears to drive said impeller thereby,
   a brake disc carried by said axle for operatively engaging said disc to control rotation thereof,
   a drive plate operatively carried by said wheel and engaging said support shafts of said planetary gear means, and
   control means operatively positioned on said axle to engage said brake disc and control rotation thereof and that of said first-named disc to control the drive speed of said impeller in relation to the speed of said wheel.

4. In combination with an axle and a wheel journalled in said axle,
   a turbo-brake including an impeller operatively carried by said axle to draw in air from adjacent said axle and perform work thereon,
   planetary gear means operatively connecting said wheel to said impeller to drive it at a greater speed than the speed of said wheel,
   a reaction ring secured to said wheel radially outwardly of said impeller, and
   generally radially extending circumferentially spaced curved reaction vane means on said reaction ring to receive air discharged from said impeller in a generally radial direction and effect further braking action by work performed thereon to change its flow to a generally axially and radially outward direction, said reaction ring having a smoothly contoured radially inner surface enlarging the diameter of said reaction ring in an axially outwardly extending direction.

5. In combination with an axle and a wheel journalled in said axle,
   a turbo-brake including an impeller operatively carried by said axle to draw in air from adjacent said axle and perform work thereon,
   planetary gear means operatively connecting said wheel to said impeller to drive it at a greater speed than the speed of said wheel,
   secondary drive means including a positioning plate connecting said wheel to said planetary gear means for secondary drive thereof,
   a reaction ring secured to said wheel radially outwardly of said impeller, and
   generally radially extending circumferentially spaced curved reaction vane means on said reaction ring to receive air discharged from said impeller in a generally radial direction and direct such air radially and axially outwardly of said wheel, said reaction ring having a smoothly contoured radially inner surface to aid in the air flow control.

6. A turbo-brake for connection between a wheel and an axle on which the wheel is journalled, which turbo-brake comprises a rotary-type air mover including an impeller having a hub rotatably carried by said axle, a plurality of generally radially extending vanes on said impeller, said impeller when rotated drawing air axially inwardly adjacent said axle and forcing air generally radially outwardly of said wheel, ring gear means operatively associated with the inner periphery of said wheel, pinion gears engaging said ring gear means, a disc on which said pinion gears are journalled, said disc operatively engaging said wheel, a floating gear ring carried by said axle and having both internal and external gear means thereon with said external gear means engaging said pinion gears, compound planetary gear means including support shafts operatively engaging said internal gear means, sun gear means operatively carried by said hub and engaging said planetary gears to drive said impeller, and braking means carried by said axle for operatively engaging said disc to control rotation thereof.

References Cited in the file of this patent
UNITED STATES PATENTS

| | | |
|---|---|---|
| 984,849 | Radcliffe | Feb. 21, 1911 |
| 1,483,075 | Chilton | Feb. 12, 1924 |
| 1,903,293 | Isaacson | Apr. 4, 1933 |
| 2,219,215 | Anderson | Oct. 22, 1940 |
| 2,241,189 | Dick | May 6, 1941 |
| 2,415,670 | Black et al. | Feb. 11, 1947 |
| 2,517,531 | Anderson | Aug. 8, 1950 |
| 2,618,175 | Bruce | Nov. 18, 1952 |
| 2,923,177 | Winchester | Feb. 2, 1960 |